Patented Oct. 7, 1941

2,257,868

UNITED STATES PATENT OFFICE 2,257,868

TRIFLUOROACETYL HALIDE AND A PROCESS OF MAKING IT

John M. Tinker, Penns Grove, N. J., assignor to E. I. du Pont de Nemours & Company, Wilmington, Del., a corporation of Delaware No Drawing. Application November 28, 1939, Serial No. 306,578

6 Claims. (Cl. 260—544)

This invention relates to novel fluorine-containing acetyl halides of the general formula

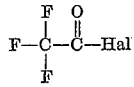

wherein Hal is from the group of chlorine and bromine; and to a process of preparing the same.

An object of this invention therefore is to synthesize compounds falling under the general formula which compounds are of utility as intermediates in the manufacture of dyes and of fine chemicals. A further object of my invention is to provide a process by which compounds falling under the general formula may be synthesized. These and other objects will more clearly appear hereinafter.

The objects of this invention are realized by reacting the corresponding fully halogenated acetic acids containing fluorine, with benzoyl chloride or with benzoyl bromide.

It was found that when trifluoro-acetic acid is heated with benzoyl chloride, trifluoro-acetyl chloride is formed, and similarly difluoro-chloro- and dichloro-fluoro-acetyl bromide result when benzoyl bromide is heated with difluoro-chloro- and dichloro-fluoro-acetic acid, respectively.

The following examples illustrate the invention. Parts are by weight.

Example I

Trifluoro-acetyl chloride

One part of 100% trifluoro-acetic acid is mixed with 1.84 parts of benzoyl chloride and gradually heated in a container fitted with a reflux condenser sufficiently effective to retain most of the free acid. The top of the condenser column is connected with a receiver cooled with solid carbon dioxide. When the temperature of the reaction mass reaches +60° C., the evolution of trifluoro-acetyl chloride together with some hydrogen chloride starts. In the course of 40 minutes the temperature of the mass is brought to 180° C., during this time the temperature on top of the column should at no time exceed +40° C. The trifluoro-acetyl chloride collects in the cooled receiver and is then purified by fractionation. Trifluoro-acetyl chloride boils at −19° to −18° C. at 1 atm. pressure.

Example II

Trifluoro-acetyl bromide

One part of 100% trifluoro-acetic acid is mixed with 2.43 parts of benzoyl bromide. This mixture is treated in exactly the same manner as the above mixture of trifluoro-acetic acid and benzoyl chloride in Example I. Trifluoro-acetyl bromide boils at 0° to +1° C. at 1 atm. pressure.

Example III

Difluoro-chloro-acetyl bromide

One part of 100% difluoro-chloro-acetic acid is mixed with 1.53 parts of benzoyl bromide and gradually heated in a container fitted with a reflux condenser column sufficiently effective to retain most of the free acid. The top of the column is connected with a receiver cooled with ice salt mixture. When the temperature of the reaction mass reaches +70° C., the evolution of difluoro-chloro-acetyl bromide and hydrogen bromide sets in violently, some bromine is also liberated. In the course of 40 minutes the temperature of the reaction mass is brought to 180° C., meanwhile the temperature on top of the column should at no time exceed 70° C. The difluoro-chloro-acetyl bromide collects in the cooled receiver and is then purified by fractionation. Difluoro-chloro-acetyl bromide boils at 49° to 50° C. at 1 atm. pressure.

Example IV

Dichloro-fluoro-acetyl bromide

One part of 100% dichloro-fluoro-acetic acid is mixed with 1.88 parts of benzoyl bromide. This mixture is treated in the same manner as the above mixture of difluoro-chloro-acetic acid and benzoyl bromide in Example III, with the exception that the temperature on top of the column is allowed to rise above 96° C. and is not permitted to exceed 130° C. The dichloro-fluoro-acetyl bromide collects in the cooled receiver and is then purified by fractionation. Dichloro-fluoro-acetyl bromide boils at 93° to 94° C. at 1 atm. pressure.

It is understood that the above examples are for purposes of illustration, and that wide variations in the conditions of the reaction can be practiced, and that the process is likewise susceptible to wide variation in the matter of reactants without departing from the spirit and without violating the scope of the invention as defined in the following claims.

I claim:

1. A process which comprises heating trifluoro-acetic acid with benzoyl chloride and separating the trifluoro-acetyl chloride formed.

2. A process which comprises heating trifluoro-acetic acid with benzoyl bromide and separating the trifluoro-acetyl bromide formed.

3. New compounds of the general formula

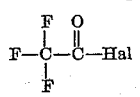

wherein Hal is a member of the group consisting of chlorine and bromine.

4. Trifluoro-acetyl chloride.
5. Trifluoro-acetyl bromide.
6. A process which comprises heating trifluoro-acetic acid with a benzoyl halide of the group consisting of benzoyl chloride and benzoyl bromide, and separating the trifluoro-acetyl halide formed.

JOHN M. TINKER.